Oct. 28, 1958  W. T. RENTSCHLER  2,857,829
PHOTOGRAPHIC SHUTTER
Filed April 20, 1956
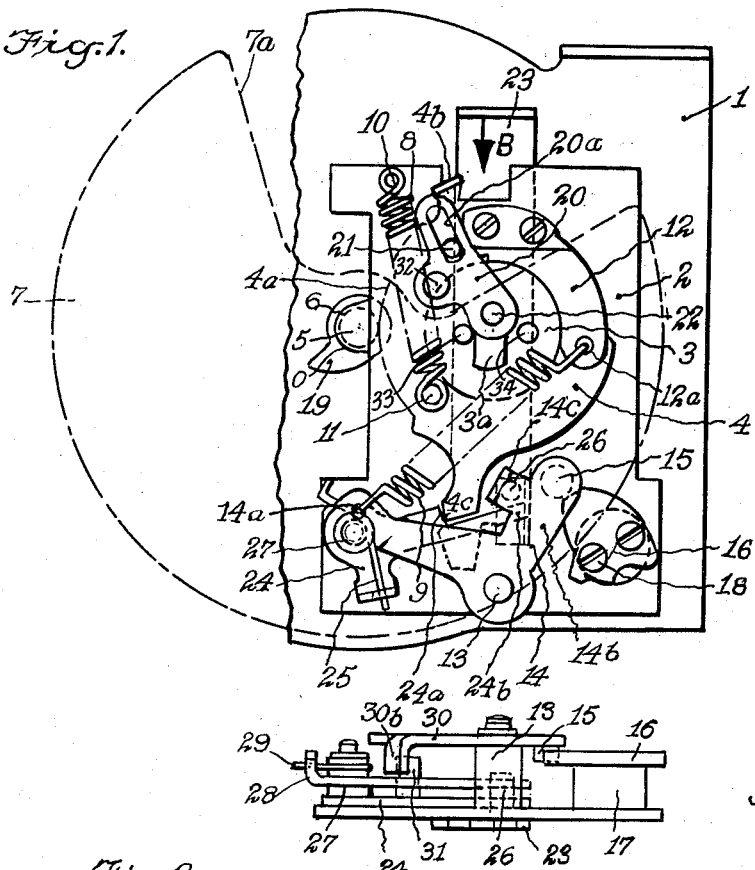
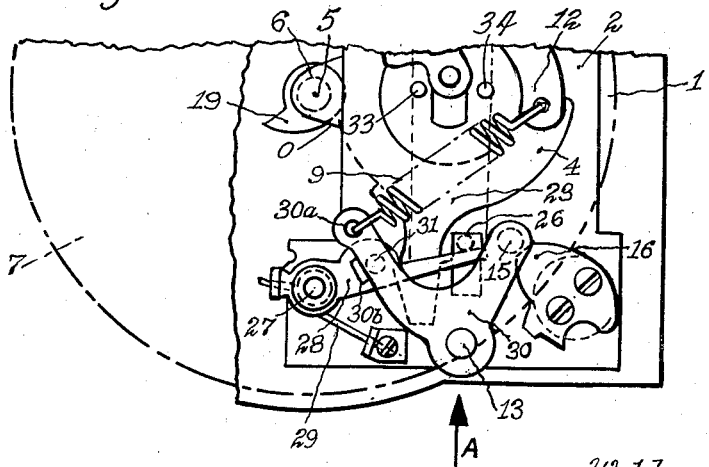
INVENTOR.
Waldemar T. Rentschler
BY
Munn, Liddy, Nathanson & March
ATTORNEYS

2,857,829

PHOTOGRAPHIC SHUTTER

Waldemar T. Rentschler, Calmbach, Enz, Germany, assignor to Alfred Gauthier G. m. b. H., Calmbach, Enz, Germany, a corporation of Germany Application April 20, 1956, Serial No. 579,562

Claims priority, application Germany April 30, 1955

6 Claims. (Cl. 95—59)

This invention relates to photographic shutters, and more particularly to shutters wherein a spring-charged driving member may be optionally driven either solely by a main spring, or else by said main spring in conjunction with an additional spring.

Photographic shutters of the type having driving members actuated by a plurality of springs, either one or more of which may be utilized at a time, are already known. In these shutters, the setting of an exposure-time setting member is utilized to control the action or tensioning of the additional or auxiliary driving spring. Such control is effected mostly for those settings where the shortest exposure times are desired. These prior shutters, however, have a disadvantage in that the adjustment or setting of the exposure-time setting member, where the latter effects a control of the auxiliary driving spring, requires a very high turning moment. That is, resistance is imposed on the setting member by the auxiliary spring, and this is especially true when the shutter driving member is in its cocked position. In some photographic shutters of this type the turning moment may be so high as to actually preclude setting or adjusting of the exposure setting member for cocked positions of the shutter. It is readily seen that a condition such as this contributes greatly to the difficulty of properly operating the shutter and camera.

The present invention obviates the above difficulty and disadvantage of prior photographic shutters driven by a plurality of springs, by providing an organization wherein the exposure-time setting member may at all times be easily adjusted or set, regardless of whether or not the shutter driving member is cocked.

Accordingly, one object of the invention is to provide a novel and improved photographic shutter construction wherein the driving member may be optionally driven by one or several springs with the action of the additional spring or springs controlled by the exposure-time setting member, which shutter construction is characterized by easy and facile turning or adjustment of the setting member regardless of whether or not control of the auxiliary spring is desired, and regardless of whether or not the driving member is in cocked position.

The above object is accomplished, in accordance with the invention, by the provision of a locking device which is releasable or actuated prior to releasing of the shutter driving member, said device being associated with a movable anchorage for an auxiliary driving spring and functioning (when locking) to render said movable anchorage independent of the exposure-time setting member. This locking is made to occur when cocking the shutter (or more specifically the driving member therefor), since such cocking tends to charge or activate the auxiliary spring, which operation in prior shutter constructions imposes such a load on the exposure-time setting member as to render adjustment thereof difficult if not impossible. The locking action on the spring anchorage is such as to further stress the auxiliary spring, that is, to cause it to exert its greatest force, since the locking movement is made to shift the anchorage in a direction opposite to that in which it is normally biased by the spring.

In accordance with the above construction there is positively prevented any adverse influence which might be imparted to the exposure-time setting member by the auxiliary spring or the movable anchorage therefor, and accordingly the required turning moment for moving such setting member to all of its positions may be uniform and very low. Additionally, this action is effected only for the cocked condition of the shutter driving member, since for other conditions of said member there is no additional force or loading involved; thus there results the smallest possible pretension of the shutter blade driving mechanism.

In one specific embodiment of the invention the said locking action is accomplished by providing on the shutter release slide a pin which constitutes one part of the locking device, and by providing on the movable anchorage of the auxiliary spring a lug engageable with the said pin and constituting the second part of the locking device. In this embodiment, the locking pin is also utilized as part of a latch means which releases the shutter driving member, thereby minimizing the number of components required in the shutter structure.

In another embodiment of the invention an advantageous mechanical advantage is obtained in a very simple manner, by utilizing a lever which is actuated by the pin on the shutter release slide, said lever having an abutment pin engageable with an abutment lug on the spring anchorage. By suitable location of the said abutment pin on the lever, it may exert an appreciable force on the anchorage abutment in response to smaller forces exerted on the lever by the pin carried by the shutter release slide.

In shutter structures wherein a cover blade system is provided, the locking means may be actuated for release, in accordance with the invention, by a movable member constituting a portion of said cover blade system.

Another object of the invention is to provide a novel and improved shutter construction having all of the above features and advantages and which is nevertheless simple in structure and economical to manufacture.

Other features and advantages will hereinafter appear.

In the drawings accompanying this specification, similar characters of reference indicate corresponding parts wherever possible in the several views, in which:

Figure 1 is a top view of a shutter mechanism of the rotating blade type, embodying the invention. The shutter is shown in cocked position, and is set for the shortest exposure time. A lever carrying the movable anchorage of the auxiliary driving spring is shown as locked and independent of the time-exposure setting member, in accordance with the invention.

Fig. 2 is a fragmentary view somewhat like Fig. 1 but illustrating a modified form of the invention wherein the locking device includes a lever providing a desirable mechanical advantage. In Fig. 2 the shutter is also in cocked position and set to the shortest exposure time.

Fig. 3 is a fragmentary edge elevational view of Fig. 2, looking in the direction of the arrow A in this figure.

The shutter structure illustrated herein, in which the invention is embodied, is not completely illustrated in all those details which are well known, since such details may be found in widely sold cameras known as "Robot" cameras. The cover-blade and release-slide mechanisms incorporated in these cameras being well known in the art, detailed description thereof where not involving the essence of the invention have been omitted for the sake of brevity and clarity of illustration.

Referring to Fig. 1, the shutter construction shown therein comprises a base plate 1, which has the usual exposure opening (not shown adapted to be covered by a rotating blade shutter. Secured to the base plate 1 is a fixed mounting plate 2, spaced from the base by the usual bushings. The mounting plate 2 has a bearing 3 on which there is pivoted a driving member 4. The bearing 3 is fixed to the supporting plate 2 by rivets 33 and 34, and has a cylindrical portion or barrel about which the member 4 turns, and an end flange engaging the member 4 to position the latter against axial movement. Thus, the bearing 3 supports the member 4 for turning while preventing axial movement of such member. As is usual, the driving member 4 has a toothed portion 4a meshing with a pinion 6 carried by a spindle 5. Also carried by the spindle 5 and rigidly attached thereto is a rotating shutter blade 7 having a segment-shaped notch 7a cooperating with the exposure opening indicated by the letter "O" in Figs. 1 and 2, such opening being in the base plate 1 to effect an exposure of the film in the camera.

For the purpose of biasing and driving the driving member 4 and thus the shutter blade 7 there is provided a main tension spring 8 and an auxiliary or additional tension spring 9. One end of the main spring 8 is anchored to a stationary pin 10 carried by the mounting plate 2, the other end of the spring being attached to a pin 11 fixed on the driving member 4. The member 4 has an arcuate member 12 provided with an aperture 12a through which one end of the auxiliary spring 9 extends. The counter bearing or movable anchorage for the auxiliary spring 9 comprises a two-armed lever 14 carried by a pivot 13 secured to the mounting plate 2. The lever 14 has an aperture 14a through which the remaining end of the auxiliary spring 9 extends. One arm 14b of the lever 14 has a cam follower in the form of a pin 15 engageable with a setting cam 16 rotatably carried by the mounting plate 2. The cam 16 is attached, by means of screws 18, with the spindle or shaft 17 of a well known exposure-time setting member (not shown). The shaft 17 may also carry additional sets of cams for other purposes, and which also have been omitted for the sake of clarity, such cams serving to control for example an escapement mechanism (not shown) for obtaining various exposure times, etc. Such escapement mechanism may cooperate with a finger piece 19 fixed on the shaft or spindle 5.

Cocking of the shutter blade 7 may be effected by turning the cocking member 4 counterclockwise through the medium of an arm 4b thereon. Such cocking may be effected in a well known manner, by means of known spring devices which are not shown herein, since they constitute no part of the present invention. Such known spring devices, which are found in well known "Robot" cameras, may be controlled through the medium of a lever 20 connected with the cocking member 4 by a pin and slot connection 20a, 21, the lever 20 being carried on a shaft 22 fixed to a slide 23 which constitutes the release for the driving member 4 and rotary shutter blade 7. The said known spring device is actuated by a pin 32 carried on a lateral projection of the lever 20, as clearly shown in Fig. 1. The pin 32 is engageable with and releases a locking member (not shown) of the said spring device, which holds such spring device in check. Further details are not given here, since they are well known in the prior art. The pin 32 as viewed in Fig. 1 extends upward from the paper and does not interfere with movement of the lever 20. By virtue of the pin-and-slot connection 20a, 21 the lever 20 turns in the same direction as the driving and cocking member 4. Thus, during running-down clockwise movement of the member 4, the lever 20 also has a clockwise movement. At the end of the running-down movement of the shutter the pin 32 fixed on lever 20 reaches the mentioned locking member of the spring device (both not shown) and by this action it releases the device, so that the latter may effect a subsequent cocking of the shutter in a well-known manner. A part of the spring device cooperates with the bent arm 4b of the cocking and driving member 4. The cooperation is such that the cocking and driving member 4 is moved in counterclockwise direction thereby, from its uncocked position to the position shown in Fig. 1. To provide for longitudinal sliding movement of the slide 23, the shaft 22 moves in a slot 3a provided in the bearing member 3 of the mounting plate 2. The mounting of the lever 20 on the shaft 22 which is carried by the slide 23 is conventional in shutter structures of "Robot" cameras, and fuctions to effect proper cooperation between the pin 32 and the aforementioned but not shown locking member and spring device involved in cocking of the member 4. The said spring device is allowed freedom of movement during running down of the shutter as initiated by depressing the slide 23 in the direction of the arrow "B." Further details of such structure are not given, since they are not important to an understanding of the invention. It will be understood that by virtue of the pin and slot connection 20a, 21 between the member 4 and the lever 20 these two parts are coupled to each other for all positions of the slide 23, the lever 20 being always in an angular position which is controlled by the position of the member 4.

As is well known in shutter structures of "Robot" cameras, the arm 4b cooperates with a cocking part of a spring device which, after it is set free for movement by the pin 32 moves the cocking and driving member 4 counterclockwise to the cocked position of Fig. 1. In such "Robot" cameras the cocking part is constituted as a turnable disc the axis of which is parallel with the arrow "B" shown in Fig. 1, as is well known in the art. Such disc has two pins parallel to its axis which engage one after the other the arm 4b and thereafter disengage the arm, in a well known manner. Further details of such structure are not necessary to an understanding of the present invention, and may be readily found in the prior art and in "Robot" type cameras.

The lever 20 is seen to lie in a different plane from the driving member 4. As seen in Fig. 1, the lever 20 is in front of the member 4, and the pin 32 projects from the lever 20 in a direction upward or away from the member 4. It will be understood that, in shutters of the present type, conventionally the slide 23 may be connected with, and constitute a portion of a well known cover blade system which is not illustrated herein for the purpose of clarity, since such sytem per se forms no part of the present invention. It will suffice to state that such cover blade system covers the exposure opening in the base plate 1 when the slide 23 is in the position shown in Fig. 1. When the slide 23 is shifted downward as viewed in Fig. 1, the cover blades expose or reveal the exposure opening O, in a well known manner. The cover blade system may comprise two cover blades of the well known type, which from juxtaposed, closed positions are movable away from each other in opposite directions parallel to the arrow B of Fig. 1, for the purpose of revealing the exposure opening O in the base plate 1. In a well known manner, between the slide 23 and the cover blades, transmission levers may be arranged to translate the straight line movement of the slide 23 into opening and closing movements of the cover blades.

Retention of the cocking member 4 in cocked position is effected by a latch means comprising a lever 24 biased counterclockwise by a spring 25, said lever locking an arm 4c of the driving member 4 by means of an abutment or shoulder 24a. Release of the driving member 4 and of the shutter blade 7 is effected by the slide 23 when the latter is shifted downward from the position of Fig. 1. For this purpose, the slide 23 is provided with a pin or operator 26 engageable with an arm 24b of the lever 24, such engagement shifting the lever 24 clockwise so as to free the arm 4c of the member 4.

It will be understood that, for certain positions of the setting cam 16, the auxiliary driving spring 9 will be made operative to apply additional driving force to the driving member 4, while for other settings of the cam 16 only the main driving spring 8 is effective for actuating the driving member 4. Retention of the cam 16 in any adjusted position may be effected in the well known manner, by the use of well known notches (not shown) cooperating with the external exposure-time setting member (also not shown).

In accordance with the present invention I provide a novel locking device adapted to be actuated prior to release of the driving member 4, said locking device acting on the two-armed lever 14 during the cocking of the shutter driving member 4 (for all settings of the exposure-time setting member) to render the movable anchorage (comprising the lever 14) of the spring 9 independent of the exposure-time setting member which latter, as herein shown, may be considered the setting cam 16. Such locking action stresses the spring 9 a slight additional amount, by virtue of the movement of the anchorage for said spring being in a direction opposite to the bias provided on the anchorage by the spring.

As shown, this locking device includes a pair of abuttable members comprising a lug 14c carried by the lever 14, said lug being cooperable with the pin 26 fixed to the slide 23. It is understood that the slide 23 may be moved downward either manually or by spring power which is in turn manually controlled. Upon the slide 23 being raised to the position shown in Fig. 1 the pin 26 thereof will engage the lug 14c and shift the lever 14 a slight amount counterclockwise, thereby separating the cam follower pin 15 from the setting cam 16 and rendering the lever 14 independent of the cam 16 regardless of the settings of the latter. Thus, for the cocked position of the driving member 4, the independence effected between the anchorage 14 and the setting cam 16 will enable the latter to be adjusted or set in any desired position with the exertion thereon of a minimum amount of turning torque. Also, such torque will at all times be uniform.

Operation of the shutter shown in Fig. 1 is briefly as follows: After an exposure, the slide 23, having been depressed, returns to the raised position shown in the figure. This return may be done by a spring, upon removal of manual force from the slide, or it may be effected by release of a driving spring in response to return of the driving member 4 to its cocked or starting position.

During the return movement of the slide 23 the cover blade controlled thereby remains closed, and, in accordance with the invention, the pin 26 engages the lug 14c and shifts the lever 14 to the position shown, wherein it is independent of the cam 16. During such return of the lever 23 the auxiliary spring 9 is not fully stressed, because the exposure has already taken place and the member 4 is not cocked. Therefore the lever 14 may be easily shifted by the pin 26 to the disengaged position shown. Thereafter, the cocking member 4 is shifted counterclockwise by the arm 4b until the arm 4c is latched by the lever 24, thus cocking the member 4. With this movement, the springs 8 and 9 are both charged or tensioned, and the charging of the auxiliary spring 9 does not affect in any way the exposure-time setting cam 16 since the cam follower pin 15 is held disengaged from the cam by the pin 26 engaging the lug 14c.

To release the shutter, the slide 23 is, of course, shifted downward. In so doing, the pin 26 becomes disengaged from the lug 14c, thereupon enabling the lever 14 to be influenced, under the urging of the auxliary spring 9, by the setting cam 16. The tensioning of the spring 9 is thus controlled by said cam, since the anchorage 14 for such spring may have different adjusted positions depending on the setting of the cam. The spring 9 is thus brought to a level of energy which is proper for the adjusted exposure time. Such action occurs prior to the pin 26 actuating the release lever 24 to release the shutter driving member 4. Thus, prior to release of the shutter, the adjustment of the tension of the auxiliary driving spring 9 is effected, by means of the setting cam 16. Thereafter, the driving member 4 upon its release turns in clockwise direction from the position of Fig. 1, effecting running-down movement of the shutter. By the connection between the member 4 and the pinion 6 a counterclockwise rotation of the shutter disc 7 is effected.

The advantages of the above shutter construction are that the exposure-time setting member comprising the setting cam 16 may be easily adjusted with a minimum turning movement required, even while the driving member 4 is in cocked position, since for such condition the anchorage for the driving spring 9 is independent of the setting cam 16. It will be observed that, to effect this, the driving spring 9 is additionally tensioned. In spite of the full tension of the auxiliary spring 9 being available for the cocked position of the shutter, at the time that the shutter is released such tension has previously automatically been adjusted to that properly required, as dictated by the setting of the exposure-time setting member. Thus the shutter drive mechanism always will have exerted on it only the adjusted pretension necessary for the proper exposure time.

Another embodiment of the invention is illustrated in Figs. 2 and 3. This embodiment reveals a modified construction for controlling the anchorage of the auxiliary spring 9, thereby to effect an advantageous mechanical advantage. As shown, a lever 28 is pivoted on the pin 27 which also carries the lever 24. For the sake of clarity of illustration, the lever 24 has been omitted in Fig. 2. By means of a spring 29, the lever 28 is biased counterclockwise, maintaining it in engagement with the pin 26 on the slide 23. In Fig. 2 the movable anchorage for the auxiliary spring 9 comprises a lever 30 having an aperture 30a through which the end of the spring extends. The lever 30 has the cam follower pin 15, and on its other arm it has a lug 30b adapted to engage a pin 31 fixedly carried by the lever 28.

When, considering Fig. 2, the slide 23 is shifted downward the lever 28 will first be shifted clockwise by the pin 26, thereby disengaging the pin 31 from the lug 30b and enabling the auxiliary spring 9 to cause the cam follower 15 to engage the cam 16. Subsequently the lever 24 is actuated by the pin 26, to release the driving member 4 for its running down movement.

The advantage of the construction shown in Figs. 2 and 3 resides in the fact that a mechanical advantage exists with the lever 28, since the pin 31 thereof is located much nearer to the pivot 27 than the portion of the lever engaged by the pin 26 of the slide 23. Thus, less force is required by the pin 26 to effect disengagement between the pin 31 and lug 30b, and also it will be noted that movement of the pin 31 is in a direction transverse to movement of the lug 30b, further facilitating such facile disengagement.

In both of the embodiments of the invention illustrated above the proper setting of the movable anchorage for the spring 9 is automatically effected prior to release of the driving member 4, since manual actuation of the slide 23 results in a time interval between disengagement of the locking parts 26, 14c or 31, 30b respectively, which interval is much greater than the time interval required by the anchorage to engage the setting cam 16, due to the strong action of the auxiliary spring 9. If, however, the slide 23 is spring operated, such spring may be proportioned with respect to the auxiliary spring 9 to effect the above result.

It will be readily understood that, instead of the slide 23 being utilized for both release of the shutter drive and release of the locking mechanism which renders the spring anchorage independent of the setting cam, a separate member may be provided for effecting such locking of the anchorage, said member being actuatable prior to release of the shutter drive member. However, where a cover blade system is employed, the movable parts thereof may be advantageously used for such function, as illustrated herein. By this organization the smallest number of components need be employed.

The present invention is important since it may be applied to all types of photographic shutters wherein the drive member is optionally driven either by a main spring alone or else jointly by said main spring and an auxiliary or additional spring. The advantages of this invention, by which a free setting of the exposure-time setting member is accomplished, with always a constant and relatively low turning movement, as well as the advantage of effecting the running down movement of the shutter drive with the smallest possible pretension thereon due to the auxiliary spring, will be possible regardless of differences in the specific shutter constructions utilized.

Variations and modifications may be made within the scope of the claims, and portions of the improvements may be used without others.

I claim:

1. In a photographic shutter, the combination of a shutter-driving member adapted to be cocked and to be thereafter released for actuating the shutter; a plurality or spring means connected with the driving member, to drive the latter; a movable anchorage connected with one of said spring means, and adapted to be biased thereby; cam means including a cam adapted to be connected with and actuated by an exposure-setting member and including a cam follower engageable with said cam and connected with said anchorage for adjustably positioning the latter in accordance with settings of the setting member; locking means operable only when the driving member is in cocked position, for holding said cam follower in a position disengaged from said cam, said anchorage being thereby free of influence by said cam and the latter being freely movable independently of said follower, said anchorage causing greatest stress in said one spring means for such position; and manually operable means for releasing said locking means prior to release of the driving member, thereby to free the cam follower for engagement with said cam whereby the said movable anchorage is again positioned by the cam means.

2. The invention as defined in claim 1 in which the manually-operable means comprises a movable part actuated prior to release of the driving member, and in which the locking means comprises a pair of abuttable members carried respectively by the anchorage and by said movable part, one of said members constituting a pin and the other constituting a lug engageable with and disengageable from the pin.

3. The invention as defined in claim 2 in which there are latch means for releasably holding the drive member in cocked position, and in which there is an operator for said latch means, including the said pin.

4. The invention as defined in claim 2 in which the movable part comprises a lever carrying said pin, and in which there is means including a slide adapted to actuate said lever.

5. The invention as defined in claim 1 in which the manually-operable means comprises a movable part constituting a portion of a cover blade mechanism.

6. The invention as defined in claim 5 in which the said movable part comprises a portion of the release mechanism for the driving member.

References Cited in the file of this patent
UNITED STATES PATENTS

| | | |
|---|---|---|
| 1,963,324 | Deckel et al. | June 19, 1934 |
| 2,718,835 | Fuerst | Sept. 27, 1955 |